United States Patent
Gerrit et al.

(10) Patent No.: US 6,557,946 B1
(45) Date of Patent: May 6, 2003

(54) SPOKE NIPPLE, ESPECIALLY FOR BICYCLES AND THE LIKE

(76) Inventors: Jager Gerrit, Rue de Tilles 28, Pery CH-2603 (CH); Maurizio d'Alberto, Rainpark 16, Brugg CH-2555 (CH)

(*) Notice: Subject to any disclaimer, the term of this patent is extended or adjusted under 35 U.S.C. 154(b) by 0 days.

(21) Appl. No.: 10/009,402

(22) PCT Filed: Mar. 30, 2000

(86) PCT No.: PCT/EP00/02811
§ 371 (c)(1),
(2), (4) Date: Feb. 19, 2002

(87) PCT Pub. No.: WO00/61387
PCT Pub. Date: Oct. 19, 2000

(30) Foreign Application Priority Data

| Apr. 9, 1999 | (DE) | ......... 199 16 046 |
| Nov. 3, 1999 | (DE) | ......... 199 52 929 |
| Jan. 21, 2000 | (DE) | ......... 100 02 528 |

(51) Int. Cl.$^7$ ............ B60B 21/06; B21D 53/26
(52) U.S. Cl. ............ 301/104; 301/61; 301/58; 29/894.33
(58) Field of Search ............ 301/55, 56, 57, 301/58, 59, 60, 61, 104, 89, 110.5; 29/894.33, 894.344, 894.341, 894.342, 894.333

(56) References Cited

U.S. PATENT DOCUMENTS

| 556,124 | A | * | 3/1896 | Wolff ............ 301/58 |
| 2,450,694 | A | * | 10/1948 | Sauer ............ 411/303 |
| 2,778,690 | A | * | 1/1957 | Horling, Jr. ............ 301/58 |
| 3,289,721 | A | * | 12/1966 | Benson ............ 220/666 |
| 4,729,605 | A | * | 3/1988 | Imao et al. ............ 301/104 |
| 4,824,177 | A | * | 4/1989 | Aloy ............ 301/58 |
| 5,806,935 | A | * | 9/1998 | Shermeister ............ 301/58 |
| 6,145,937 | A | * | 11/2000 | Chen ............ 301/58 |
| 6,189,978 | B1 | * | 2/2001 | Lacombe et al. ............ 301/104 |
| 6,205,664 | B1 | * | 3/2001 | Cappellotto ............ 29/894.33 |
| 6,364,423 | B1 | * | 4/2002 | Chen ............ 301/59 |
| 6,409,278 | B1 | * | 6/2002 | Nakajima ............ 301/59 |
| 6,431,658 | B1 | * | 8/2002 | Nakajima et al. ............ 301/59 |
| RE37,868 | E | * | 10/2002 | Hillis et al. ............ 301/58 |

* cited by examiner

*Primary Examiner*—S. Joseph Morano
*Assistant Examiner*—Long Bao Nguyen
(74) *Attorney, Agent, or Firm*—Spencer Fane Britt & Browne LLP

(57) ABSTRACT

The present invention relates to a spoke nipple for bicycle wheels and similar contrivances comprising a body having a longitudinal axis in which a drill hole is disposed essentially concentrically to said longitudinal axis. A screw thread is provided extending at least over one longitudinal section of said drill hole which is provided for receiving a spoke having a corresponding thread. A quantity of glue is disposed on the spoke nipple and so structured that the glue is activated to function as an agent to secure the thread upon screwing said spoke nipple onto a spoke.

31 Claims, 3 Drawing Sheets

SPOKE NIPPLE, ESPECIALLY FOR BICYCLES AND THE LIKE

Figure 1:
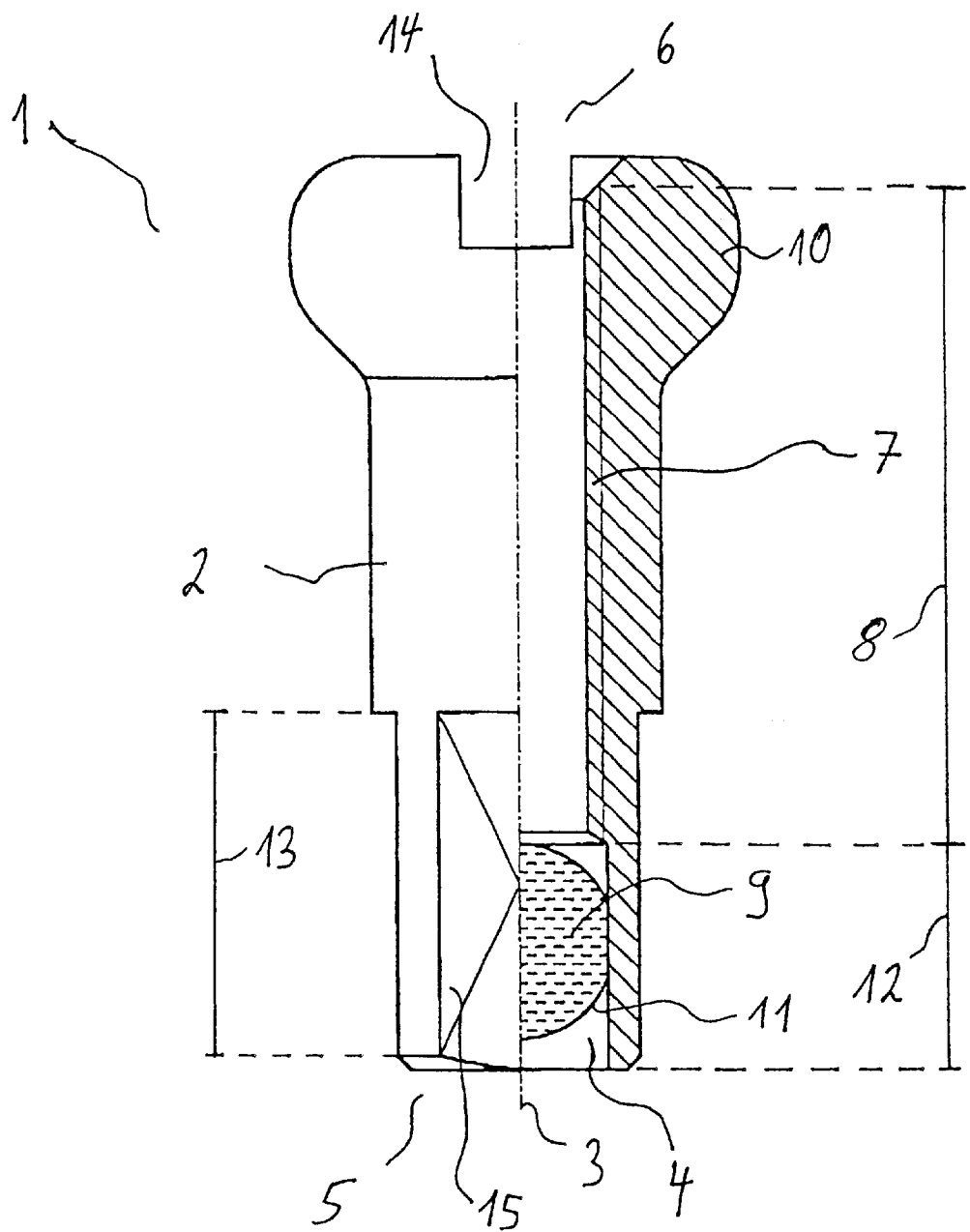

Priority benefit under 35 U.S.C. § 119 and 35 U.S.C. § 363 is claimed to: German Application No. 199 16 046.5 Filed Apr. 9, 1999, and to German Application No. 199 52 929.9 Filed Nov. 3, 1999, and to German Application No. 100 02 528.5 Filed Jan. 21, 2000, and to Patent Cooperation Treaty Application No. PCT/EP00//02811 filed Mar. 30, 2000.

DESCRIPTION

The present invention relates to a spoke nipple which is particularly well suited for use on the wheels of a bicycle, wheelchair, or other such similar contrivances.

Furthermore, the use of such spoke nipples is not solely limited to the wheels of bicycles; it is also possible to make use of such spoke nipples on the wheels of other types of single or multi-wheeled contrivances such as, for example, the wheels of a (bicycle) trailer or those on strollers and children's pushchairs. For reasons of simplification, the following description of the present invention will basically refer to its use on bicycle wheels, although this description does not in any way signify a restriction of the scope of the application.

Spoke nipples are customarily arranged on the rims of bicycle wheels for the purpose of securing the spokes. A spoke nipple is usually realized as an essentially cylindrical body having a protuberance at one end which may comprise a nipple head. When being mounted, an end of the spoke nipple is inserted from the outside into a hole in the rim which has a smaller diameter than the diameter of the nipple, respectively smaller than the diameter of the nipple head, so that the spoke nipple will be retained in the rim. An outer thread is disposed on the end of the spoke protruding radially outwardly from the hub, onto which the inner thread of the spoke nipple is screwed.

In a second known implementation, a spoke nipple will not have a so-called spoke head, but will rather be essentially realized as a conventional nut. Spoke nipples of this type are preferably used in doubled-walled or hollow-chamber rims with the spoke nipples being arranged on the rim in an area between the first and second rim wall. At that spot where the spoke is arranged, such a doubled-walled rim has holes in both walls in radial direction, whereby the exterior wall, as seen radially, has a hole of larger diameter than that of the interior wall, as seen radially, so that the spoke nipple may be inserted from the outside into the opening in the outer rim wall, but not through the opening in the radial inner wall. A spoke nipple of this type is thus partially arranged within the hollow chamber area of the rim and its end usually has a hexagonal profile which is positioned radially outwardly when in mounted state in order to screw the spoke nipple onto its corresponding spoke.

A wheel customarily has between 6 and 48 spokes which are usually distributed symmetrically around its periphery. When mounting, the individual spoke nipples are screwed on in such a manner that the rim is aligned in a plane with the radius remaining constant over the peripheral angle.

In order to enable reliable wheel properties when in use, the spokes are tensioned such that the wheel will only deform slightly, even under stress loads.

A disadvantage of spoke nipples as known in the state of the art is, however, that the spoke nipples are relatively hard to turn when screwing onto the spokes.

A further disadvantage of spoke nipples as known in the state of the art is that the screwed connection between spoke nipple and spoke often has a tendency to slacken over time, even when the screw thread is sluggish.

This leads to a situation in which the wheel becomes less stable and the rim no longer is positioned exactly on one plane so that the wheel exhibits a "buckling." Such a slackening or loosening of one or several spokes may not only result in a "buckling" and/or a less comfortable ride, but can also considerably reduce the factor of safety, among other factors.

If a spoke breaks during operation, the bicycle's overall level of safety may conceivably be considerably lowered; therefore, the causes which give rise to spokes breaking should be diminished as far as possible.

Apart from external influences such as improper handling or the use of force, material fatigue of the spoke is one of the most frequent causes for a spoke breaking, whereby the break due to material fatigue will occur upon exceeding the fatigue limit. Due to the operational load on a bicycle wheel when in use, the spoke is alternatively loaded with forces of pressure and traction whereby with a load of, for example, 900N (corresponds to a weight load of approximately 90 kg) and a wheel with 32 spokes, this load is roughly distributed over three pressure spokes and three traction spokes so that the tractive spokes are approximately exerted by an additional 300N beyond their initial tensioning while the pressured spokes are relaxed by about 300N relative their initial tension.

Since spokes can usually only take up tractive load, the spoke's pretensioning must normally be set so high that an adequately high residual tension (pretension minus pressure stress) will remain even upon higher load. On the other hand, the maximum tension of the pressured spokes (pretension plus tractive stress) has to remain within the spoke's region of flexibility. In rolling wheels, the spokes are therefore loaded with a mounting tractive stress having an amplitude in the selected example amounting to 300N. A spoke break due to fatigue frequently occurs in the area of the screw thread. But yet if the spoke's pretensioning is appropriately dimensioned, the flexible area of the pretensioned spoke shaft will take up the alternating load with load fatigue strength, thereby reducing the load on the thread and forestalling fatigue failure to a large degree. This means that a sufficiently high enough pretensioning will counteract material failure and the consequent breaking of a spoke.

In operation, such alternating loads can induce, among other things, the spoke nipple to rotate and loosen from the spoke, thus reducing the spoke tension and the safety factor.

Bicycles used in semi-professional and professional sports are made from high-quality materials; lightweight and sturdy materials are used for the bicycle wheels. With these types of wheels, the spokes are placed under a high tension when mounted in order to attain a high degree of stability and to avoid any loosening of the spokes when in operation. However, these types of high-quality wheels also require maintenance after just a short period of use.

It is therefore the task of the present invention to provide a spoke nipple, particularly for wheels such as on bicycles and other similar contrivances, which screws onto a spoke without a great degree of effort and which the use thereof prevents accidental or inadvertent slackening or loosening.

This task is solved in accordance with the present invention by the object of claims 1 and 19.

Preferred embodiments constitute the subject matter of the subclaims.

The present invention provides a spoke nipple which may be screwed onto a spoke with little effort and which the use thereof reliably prevents an accidental or inadvertent slackening of the screwed connection due to consequences of settling or vibrations.

The spoke nipple according to the present invention comprises a body which is shaped essentially rotation symmetrical relative a longitudinal axis of said body and which can be realized not only as a short body, but also as one extended substantially longitudinally.

The inventive spoke nipple furthermore comprises a bore hole arranged concentrically to the longitudinal axis and accessible from at least the first end of said body, whereby the hole preferably extends as a continuous bore hole from the first to the second end of the spoke nipple. A thread extends parallel to the longitudinal axis over at least one longitudinal segment of said hole, said thread being provided for receiving a spoke having a corresponding thread.

A quantity of glue is provided and disposed on and/or in said spoke nipple such that when screwing in a spoke, said glue is activated to secure the thread so that an automatic loosening of the spoke will then be reliably prevented.

The spoke nipple according to the present invention has numerous advantages.

Through the use of a spoke nipple according to the present invention and the quantity of glue disposed thereupon or therein which is activated upon screwing a spoke into the spoke nipple, a lubrication of the spoke nipple's inner threading and the spoke's outer threading is achieved, enabling the spoke nipples to be screwed onto the spokes without great effort.

A further advantage of the spoke nipple according to the present invention is that by activating the glue to act as a means of securing the screw thread, the spoke is reliably secured in the thread of the spoke nipple. An accidental or inadvertent loosening of the spoke nipple, respectively the spoke, is thus essentially precluded.

A durable connection between spoke nipple and spoke is especially advantageous since the use of a spoke nipple according to the present invention overcomes one of the substantial causes of spoke fatigue failure as well as the formation of "buckling" in wheels.

In a preferred embodiment of the present invention, an essentially annular protuberance is disposed as the nipple head at the second end of the spoke nipple body, whereby said annular protuberance in cross-section may be rounded-off or may be of angular profile such as triangular, quadrangular or polygonal.

Preferably, a standard glue is used in the inventive spoke nipple, said glue being a single, double or multiple component glue. Acrylic or acylate glues as well as synthetic or epoxy resins with the corresponding hardeners, or latex (micro-particles) or other standard glues as have become known in the state of the art are also preferable.

The use of a single component glue is especially advantageous since it allows for an especially easy dispersal of the glue on or in the spoke nipple.

The use of a double or multiple component glue is also especially advantageous as extended storage periods prior to mounting then becomes an irrelevant factor due to the spatially separated arrangement of the individual glue components, since preferably glue is used which also stores stably over longer periods of time so that a spoke nipple according to the present invention will be functional months or even years after its manufacture.

In an embodiment of the present invention, should a double or multiple component glue be used, it is preferred that prior to the quantity of glue being applied, respectively introduced into the spoke nipple, the glue is in the form of an emulsion (also a solution) whereby a first glue component is the base component and a second glue component is preferably disposed randomly static therein. Said second glue component may then be a constituent of said first glue component in the form of micro-particles, small or smallest droplets, cylinders, beads or globules, or in the form of stripes or ribbons. When the quantity of glue is introduced into the spoke nipple, such a distribution or a similar one is preferably essentially maintained at least in the spoke nipple. The structure is preferably not destroyed until screwing a spoke or the like into the spoke nipple. Preferably, screwing the spoke nipples onto a spoke at least partially fundamentally homogenizes the entire quantity of glue so that the two glue components are mixed together, resulting in the glue being activated.

Preferably, the second glue component is provided in micro-encapsulated form in or on the first glue component.

In a preferred embodiment of all embodiments as previously described, the glue utilized is structured in such a manner that it will fundamentally harden at room temperature within a period of up to two days, preferably within 10 hours, so as to then provide an essentially solid connection between spoke and spoke nipple subsequent to hardening. The glue preferably hardens within a few hours at normal room temperatures between 10 and 40° C., particularly preferred is a span of time lasting between approximately 30 minutes and 1 hour, such that the connection may then be subjected to loads.

In a preferred embodiment of the present invention, the quantity of glue is divided into one, two, three or more partial quantities, whereby preferably each individual partial quantity of said at least one partial quantity is in coherence.

In a further preferred embodiment of the spoke nipple according to the present invention, said quantity of glue is divided into at least two partial quantities, each preferably essentially coherent, but spatially separated from one another by means of at least a gap, a partition panel or similar dividing means.

The arrangement of the entire quantity of glue into partial quantities is especially advantageous since it enables in particular a simplified production of such spoke nipples. A further advantage rests in that the appropriate arrangement of the quantity of glue will yield a reliable distribution of said glue when screwing in a spoke.

Dividing the quantity of glue into at least two or a plurality of partial quantities is also particularly advantageous since by means of spatially separating the individual quantities of glue, the partial quantities, respectively the entire amount of glue required as a whole, can conceivably be reduced and an especially uniform application can be attained.

When utilizing a double or multiple component glue, the division into different partial quantities, which are spatially separated from one another at least by means of a gap, a partition panel or similar dividing means, is especially advantageous since the activation of the glue transpires upon the individual single components being merged.

In a further preferred embodiment of the present invention, at least one of the at least one partial quantities is essentially configured in a form taken from a group of shapes comprising beads, cylinders, rods, ellipsoids, cubes, droplets and combinations of these cited forms or the like.

In a further preferred embodiment, at least one partial quantity or fundamentally the entire quantity of glue as a whole is applied essentially evenly.

The providing of the glue in bead or droplet form is especially advantageous since these shapes have a relatively small surface. On the other hand, the providing of the glue in a flat form is also especially advantageous since it is distributed over a relatively larger surface and not just first distributed in the screw upon its being screwed in.

In the present preferred embodiment of the invention, at least one partial quantity, respectively the entire quantity of glue, has an essentially intact sealed protective layer means in order to protect the glue from external influences. Preferably said protective layer means is realized in an essentially air-tight manner so that the glue within the protective layer means is protected and can be stored for subsequent activation upon contact with, for example, oxygen.

It is furthermore preferred that the thickness of said protective layer is less than 1 mm, preferably less than 0.5 mm, preferably less than 0.1 mm or preferably less than 0.05 mm.

In a preferred embodiment, said protective layer means is realized as a casing, whereby said protective layer means may also comprise a plurality of casings enveloping one another. It also possible to provide an inner chamber which contains a first component of the glue and which is enveloped by a casing which is in turn at least partially enveloped by a second chamber, respectively component of the glue, and that a further casing is disposed at the very exterior.

It is particularly advantageous that at least one or all partial quantities are provided with a protective layer means which may be realized as, for example, one or more casings so that the quantity of glue, respectively the individual partial quantities are reliably and securely protected from their surroundings or environmental influences, so as to enable an essentially reliable functioning of the spoke nipple according to the present invention.

In the present preferred embodiment of the invention, said protective layer means is made from a material which is suitable and capable of protecting the glue from corrosive or activating influences during storage of the spoke nipple. Such an appropriate material includes the standard materials as known in the state of the art. It would thus be possible, for example, to coat the individual partial quantities with a standard finish so as to achieve the necessary protection. It is moreover possible to provide a casing, respectively a protective layer made from gelatin, polyvinyl alcohol or other such similar substances. It is furthermore possible to fabricate the protective layer from a common synthetic or natural material or another glue.

In a preferred embodiment of the present invention, the protective layer means comprises one, two or a plurality of protective layer strata, each of which can be made of different types of material. It also possible that various partial quantities of the glue have different protective layer means, respectively protective layer means made from different types of material.

In a preferred embodiment of the spoke nipple according to the present invention, at least two partial quantities of the glue are arranged adjacent one another, whereby the adjacent arrangement of components of the glue is particularly preferred when using a glue having two or more different components.

It is for example possible to provide at least two chambers as a type of glue reservoirs which are spatially separated from one another by means of at least a gap or a (thin) partition panel and which are so disposed so as to prevent an intrusion of a first glue component, which is disposed in the first chamber, into the second chamber, which contains a second component of the glue. It is preferred upon realization of this embodiment that said chambers are encased in at least one protective layer.

The adjacent arrangement of at least two partial quantities of the glue is particularly advantageous, especially when utilizing a double or multiple component glue, since a reliable mixing of the components is then attained upon activation of the glue.

In a preferred embodiment of the present invention, at least the protective layer means of one partial quantity is destroyed upon screwing in a spoke. The glue then activated and discharged first contributes to the lubrication of the screw thread and then, after it has hardened, further serves as a bonding agent for the spoke-spoke nipple connection.

When using a double or multiple component glue, it is especially preferred that the protective layer means of at least two different partial quantities is destroyed when the spoke is screwed in, so that mixing of the two partial quantities, as induced by screwing in the spoke, activates the glue and reliably secures the connection.

In a preferred embodiment of the present invention, at least a partial quantity or essentially the entire quantity of glue is at least partially disposed in the bore hole.

The arrangement of the glue in the bore hole, preferably on the side at which the spoke is to be introduced, is especially advantageous since when inserting the spoke as saturated with said glue, a reliable distribution of the glue is achieved.

The arrangement of the glue in the region of the spoke nipple screw thread is advantageous since the glue is activated upon screwing in of the spoke.

In a preferred embodiment of the present invention, at least a partial quantity is disposed essentially evenly over a section of the thread, whereby said section amounts to preferably more than 25%, especially preferably more than 50% and particularly preferably more than 75% of the length or total length of the thread.

In one or all of the above-described embodiments of the present invention, a single or double component glue is utilized for securing the nipple. The glue may be, for example, micro-encapsulated. Solvents preferably encompass the usual solvents as known in the state of the art such as alcohol, water and other such similar solvents. In a preferred embodiment, latex is employed as the glue medium.

In said preferred embodiment, when utilizing for example a double component glue, the glue medium is contained in a solution having at least three components. This is at least a polar or non-polar solvent and two glue components, one of which is preferably of small, smallest or micro-particle particulate form.

Particularly preferred with the utilization of at least two glue components is that at least one of same must be activated in order to achieve the activation of the entire glue. The activation of said first glue component may be triggered by mechanical force if said first glue component is of particulate form, ensuing for example upon screwing a spoke into the spoke nipple.

In all of the above-described embodiments of the present invention, the body of the spoke nipple is essentially made of metal; preferably brass or—for weight considerations—a light metal, especially preferred is the use of aluminum or titanium or an aluminum or titanium alloy, whereby especially the use of a thread inset made from another material can be realized in order to increase the load capacity of the thread. The surface may be coated and/or nickel-plated in order to provide protection against corrosion and/or increase the level of easy-action handling (as a slip agent).

Furthermore, in preferably all of the above-described embodiments of the spoke nipple according to the present invention, a longitudinal segment of a section near the second end has an outer or inner profile of polygonal shape which is preferably realized rectangular or hexagonal so that a suitable tool can be utilized for gripping and rotating the spoke nipple when making fine-tuning adjustments.

Preferably at least one quantity of glue is disposed in such a manner in said spoke nipple that a virtually concentric cylinder respective the longitudinal axis, having a diameter which corresponds to a thread diameter, bisects a volume of said quantity of glue. This is especially advantageous since upon screwing in of said spoke, the volume of at least a partial quantity is bisected and the glue is activated.

It is furthermore preferred that at least a smallest radial spacing from the longitudinal axis to at least one partial quantity on a plane perpendicular to said longitudinal axis is smaller than half the diameter of the thread.

In a preferred embodiment of the present invention, the glue employed is structured in such a manner that an accidental and/or inadvertent loosening of the spoke nipple-spoke connection is reliably prevented, yet still enables a fine-tuning adjustment or even a loosening of the connection with the aid of tools. Such an effect can be achieved in that the bonding of the glue subsequent to activation attains a high tenacity, thus tenaciously impeding any rotation of the spoke nipple about the spoke such that accidental loosening is also prevented upon occurrence of vibrations as those which occur during normal everyday riding circumstances.

In a further preferred embodiment of the spoke nipple according to the present invention, the glue employed is structured in such a manner that it hardens subsequent to activation.

In a further preferred embodiment of one or several of the previously-described embodiments of the present invention, the inventive spoke nipple is not disposed with a so-called nipple head, but rather is realized as a hexagonal nipple which is preferably inserted into a hollow-chamber rim. A spoke nipple of this type has a polygonal profile perpendicular to its longitudinal axis on at least one section of its outer profile which preferably is realized in hexagonal shape so that a corresponding tool may be used to screw the spoke nipple onto a spoke to be secured.

A spoke nipple according to the present invention or one of its preferred embodiments is manufactured with the method according to the present invention.

In said method, the glue is provided as a quantity of glue. Preferably the glue (which may contain a single or a plurality of components) is highly diluted in at least one solvent and at least one portion, area or section of said spoke nipple is provided with said glue, respectively glue solution, whereby when using one glue solution at least one portion of the spoke nipple is then saturated with said glue solution. The spoke nipple is then preferably dried in a subsequent step.

In a further embodiment, at least one (or a plurality of) spoke nipple(s) is at least briefly submerged in the emulsion, respectively solution, so that preferably at least the thread section of said spoke nipple or also the entire spoke nipple is saturated with the emulsion. In so doing, it is possible to exclude specific sections or portions of the spoke nipple from becoming saturated with the solution since, for example, said sections were previously treated with an agent which prevents absorption. Afterwards, the spoke nipple(s) are removed from the emulsion. Most of the emulsion remaining on the spoke nipple essentially drips off, respectively evaporates, whereby a thin coating of glue is left on the spoke nipple.

It is likewise possible that the emulsion is blown off the spoke nipple by means of a mild or strong flow of air derived, for example, from air jets.

Due to the capillary effect in the thread of the spoke nipple, a certain amount of emulsion remains in said region of the thread, while the rest of the spoke nipple then preferably remains essentially free of the glue emulsion.

In a further process step, drying of the spoke nipple ensues for example at room temperature or may also ensue at increased temperatures of 50–60° C. or up to 100° C.

The upper drying temperature limit yields from the glue which is employed; glue decomposition is to be avoided. The solvent vaporizes as it dries such that the glue ultimately remains only on the wall, respectively preferably only in the thread of the spoke nipple.

In a further preferred embodiment of the method according to the present invention, the spoke nipple is supplied with a quantity of glue. The glue here may also be provided in a glue solution. The feeding of the quantity of glue to the spoke nipple is preferably so defined that essentially the same amount of glue is always supplied to a number of different spoke nipples.

A feeding of this type may ensue by means of, for example, a thin glue conduit in the form of a flexible hose or small tube or via a dosing machine, peristaltic pump or similar dosing devices as known in the state of the art, whereby the glue is essentially fed preferably separately to each spoke nipple.

The quantity of glue is preferably introduced into the through bore-fit of said spoke nipple. It is possible that an even distribution of the glue ensues upon feeding; it is however also possible that the spreading of the quantity of glue over a surface transpires subsequent to it being supplied. For example, it is possible that subsequent to the feeding of the quantity of glue, the spoke nipple is rotated about its longitudinal axis so that a uniform distribution of the quantity of glue ensues from centrifugal force. It is likewise also possible that the feeding of the glue transpires in such a manner that the quantity of glue evenly saturates at least one section of the spoke nipple.

Also in the present preferred embodiment, the spoke nipple is preferably subsequently dried.

These procedural steps result in the spoke nipple being effectively secured when screwed onto a spoke since the quantity of glue is fundamentally uniformly distributed over a larger area and preferably over the entire thread. Such an even and uniform application of glue bestows considerable advantages.

During the manufacturing of wheels for bicycles, automatic drivers for mounting spokes are customarily employed which automatically mount the spokes on the wheels. As previously mentioned, the spoke pretensioning plays a large part in a wheel's safety, durability and loading capacity. Therefore, the automatic drivers tighten the spokes to a predefined and adjustable torque resulting in an essentially fixed and constant spoke tension for all spokes of a wheel.

Should spoke nipples be employed having a central, for example spherical, quantity of glue, said quantity of glue can induce a sometimes not insignificant resistance upon insertion of a spoke into the nipple. In such cases, the torque as applied by these conventional automatic machines is not constant and it is possible that the torque will reach a magnitude corresponding to the set maximum torque just before or at the moment of the casing of the quantity of glue being pierced.

In accordance with their programming, such automatic drivers would then conceivably continue on with the tightening of the next spoke, so that it very well may be likely that individual spokes of the wheel are not properly tightened, thus reducing the overall level of safety. Should such spoke nipples be used, care must be taken to ensure that either adapted automatic drivers are used or that the spokes may also be, for example, fitted manually. It is also further possible to provide for the disposing of the quantity of glue in the spoke nipple and the choice of material employed such that torque is not increased upon piercing the glue casing.

It is in fact very advantageous to employ a spoke nipple in which the quantity of glue is applied essentially evenly over the thread of said spoke nipple. When a spoke is inserted into said spoke nipple and the spoke nipple is then rotated, the torque applied is then constant and does not change upon destruction of the glue casing, excluding any sudden changes in torque. This is particular advantageous since conventional automatic drivers may then also be employed.

A further advantage of the method according to the present invention is that no other very likely costly machines are required. Should the quantity of glue be inserted into the nipple in the form of a bead, for example, a separate machine is required in order to provide each individual nipple with the corresponding bead of glue subsequent to production of the nipple. In normal nipple manufacturing methods, such a machine is not provided, so that manufacturing expenditures are increased by the need for employing another special machine.

When the spoke nipple is provided with an even quantity of glue in the method according to the present invention, there is then no need for an additional special machine. In the simplest case of the inventive method, a sieve is employed for submerging a number of spoke nipples into a glue emulsion. After removing the sieve with the spoke nipples therefrom, the nipples can be dried and then used immediately thereafter.

Spoke nipples according to the present invention, in which the quantity of glue is essentially disposed in the hollow region of said nipple, offer the advantage that even when storing a plurality of spoke nipples in a receptacle, the quantities of glue in the different nipples normally do not make contact so that all the quantities of glue remain intact. Should a quantity of glue be brought onto the spokes at this stage, the individual quantities of glue could contact, with resultant effects including an inadvertent activation.

A further advantage is that when only the spoke nipples are provided with a quantity of glue, a manufacture or dealer only needs to have a small number of different products in stock since the number of different spoke nipples on the market is less than the number of different spokes (spokes are offered in many different lengths).

Figure 2:
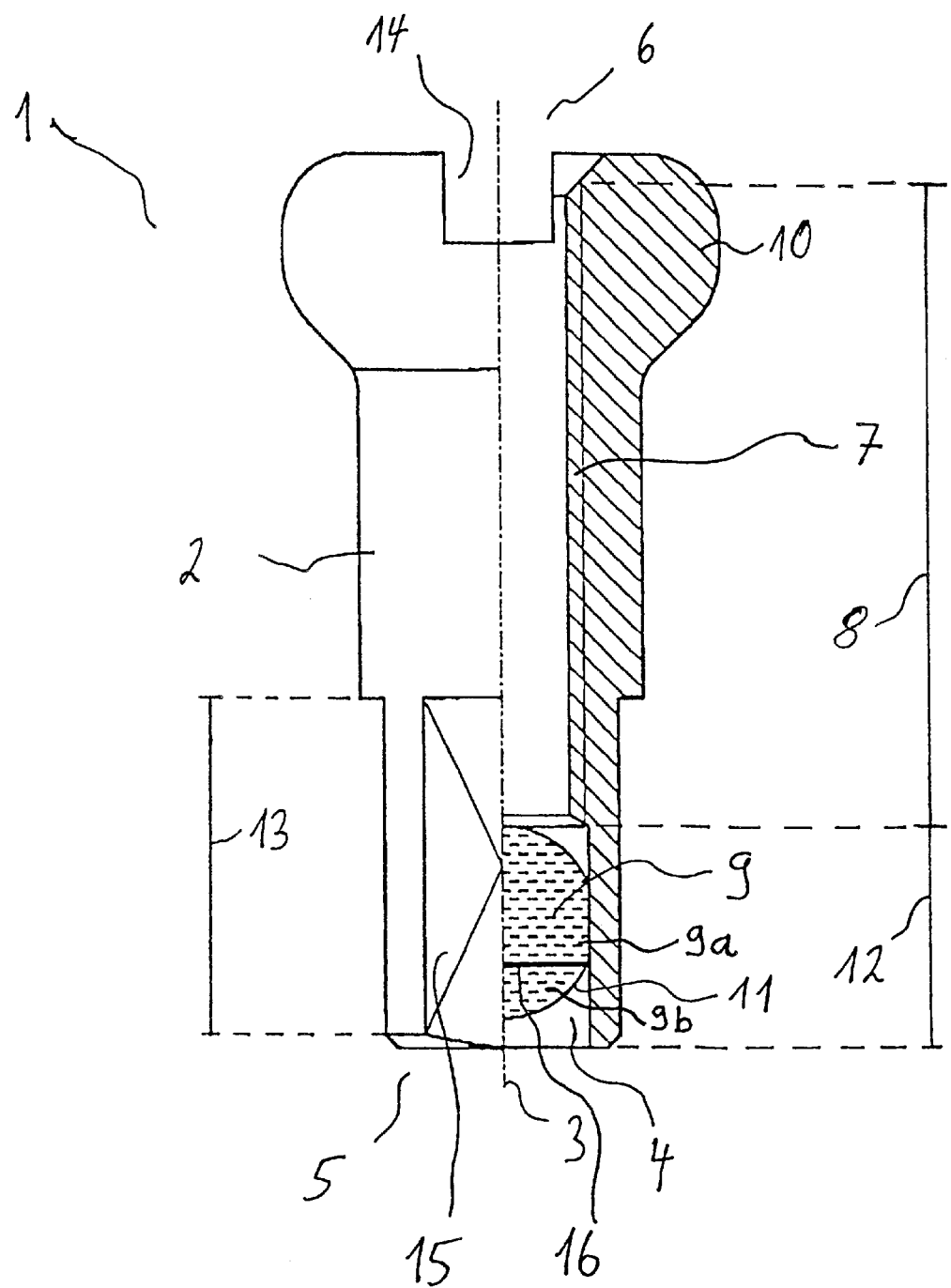

Further advantages, characteristics and possible applications of the present invention will now be described in the following with respect to the embodiments and in reference to the drawings, which show:

FIG. 1 a half-section side view of a spoke nipple according to the present invention;

FIG. 2 a half-section side view of a further embodiment of the spoke nipple according to the present invention; and FIG. 3 a half-section side view of a further embodiment of the spoke nipple according to the present invention A first embodiment of the spoke nipple 1 according to the present invention, especially for a wheel of a bicycle, will now be described with reference to FIG. 1.

Spoke nipple 1, represented in the figure in half-section, comprises a body 2, extending in essentially longitudinal and cylindrical form, and a first end 5 and a second end 6, whereby said first end 5 is provided for receiving a spoke (not shown).

Body 2 of spoke nipple 1 is realized essentially rotation symmetrical to longitudinal axis 3 and has a bore hole 4 which in the embodiment extends through from said first end 5 to said second end 6.

In a section 12 near said first end 5 of spoke nipple 1, bore hole 4 has a larger diameter than in the remaining area which comprises longitudinal section 8 having an inner thread.

In the embodiment shown, an annular protuberance, respectively spoke nipple head 10, is disposed at said second end of said spoke nipple 1, which is rounded off parallel to the longitudinal axis in cross-section.

An opening 14 is additionally provided at said second end 6 of said spoke nipple which is realized essentially rectangular in a plane perpendicular to longitudinal axis 3 in the shown view and is configured such that the spoke nipple may be rotated with a tool, for example a screwdriver. When mounting the spoke nipple according to the present invention, a tool is inserted into opening 14 and the spoke nipple screwed onto a spoke.

At said first end 5, spoke nipple 1 has a section 13 parallel to longitudinal axis 3 in which said spoke nipple 1 has a polygonal outer profile in a plane perpendicular to said longitudinal axis 3, realized in the embodiment as a rectangle with four side surfaces 15.

When fitting, a tool is first inserted into opening 14 and then rotated, so that spoke nipple 1 is screwed onto a spoke. The fine-tuning adjustments then ensue with the use of a tool which is positioned in section 13 and which is non-rotatably connected to said spoke nipple 1 via form-fit with side surfaces 15 so that a turning of said tool (not shown) enables the fine-tuning of said spoke nipple.

A quantity of glue 9 is disposed in bore hole 4 near said first end 5 of said spoke nipple 1 which comprises a protective layer 11. In the present embodiment, the entire quantity of glue is disposed as a partial quantity in a form essentially corresponding to that of a bead. Glue quantity 9 has a protective casing 11 which, when in intact sealed state, prevents a hardening of the glue, whereby said protective casing 11 is structured in such a manner than said protective casing 11 is destroyed when a spoke is inserted into bore hole 4 at said first end 5 of said spoke nipple 1 so that the glue 9 saturates the outer thread of said spoke and the inner thread of said spoke nipple 7, arranged in section 8, and contributes to the lubrication of the threads, allowing spoke nipple 1 to rotate easily on the spoke.

In the embodiment shown, a glue is employed which hardens sufficiently within 20 minutes at room temperature as to allow a first load on the connection.

FIG. 2 represents a second embodiment of spoke nipple 1 according to the present invention. The dimensions and designations of this second embodiment correspond to those of the first embodiment.

The spoke nipple according to the present invention comprises a form extending essentially longitudinally and essentially rotation symmetrical to longitudinal axis 3 with a through bore hole 4 which has a larger diameter in a section 12 near the first end 5 of spoke nipple 1. Said through bore hole 4 comprises a section 8 having an inner thread 7 extending essentially over the remaining length of said spoke nipple 1.

A quantity of glue 9 is disposed in section 12 of said bore hole 4 near said first end 5 of said spoke nipple 1 which, as in the first embodiment, is realized in bead form.

The bead of glue 9 comprises a first chamber 9a and a second chamber 9b, which are of differing sizes, whereby when seen from first end 5, first the smaller chamber 9b is arranged and behind it, the larger adjoining chamber 9a.

In this embodiment, a double component glue is employed as the glue, whereby the glue, respectively a first glue component, is arranged in said first chamber 9a and the hardener, respectively the second glue component, is arranged in the second chamber 9b. Glue bead 9 has an outer protective layer 11 for preventing any escaping discharge of the glue. Furthermore, a protective layer 16 is disposed between said first chamber 9a and said second chamber 9b, which prevents the mixing of the two glue components in normal state.

During mounting of said spoke nipple 1, upon a spoke being inserted into bore hole 4 from first end 5 of said spoke nipple 1, outer protective layer 11 and the partitioning layer 16 between both glue chambers is destroyed so that upon further insertion of the spoke (not shown) into bore hole 4, both glue components become effective and are reliably mixed, triggering an activation of the glue.

The glue thus released then saturates the threads, firstly achieving a lubrication of the screw connection and additionally the hardening of the glue within a brief period of time, whereby the hardening time is contingent upon the glue employed and which amounts to between two minutes and several hours at room temperature when utilizing preferred glues.

Although it is not shown in FIGS. 1 and 2, it is pointed out that the quantity of glue may not only be disposed in such a bead form as depicted, but rather in any other form. It is likewise possible to distribute the quantity of glue evenly or in small glue droplets in, for example, section 8 of thread 7.

Figure 3:
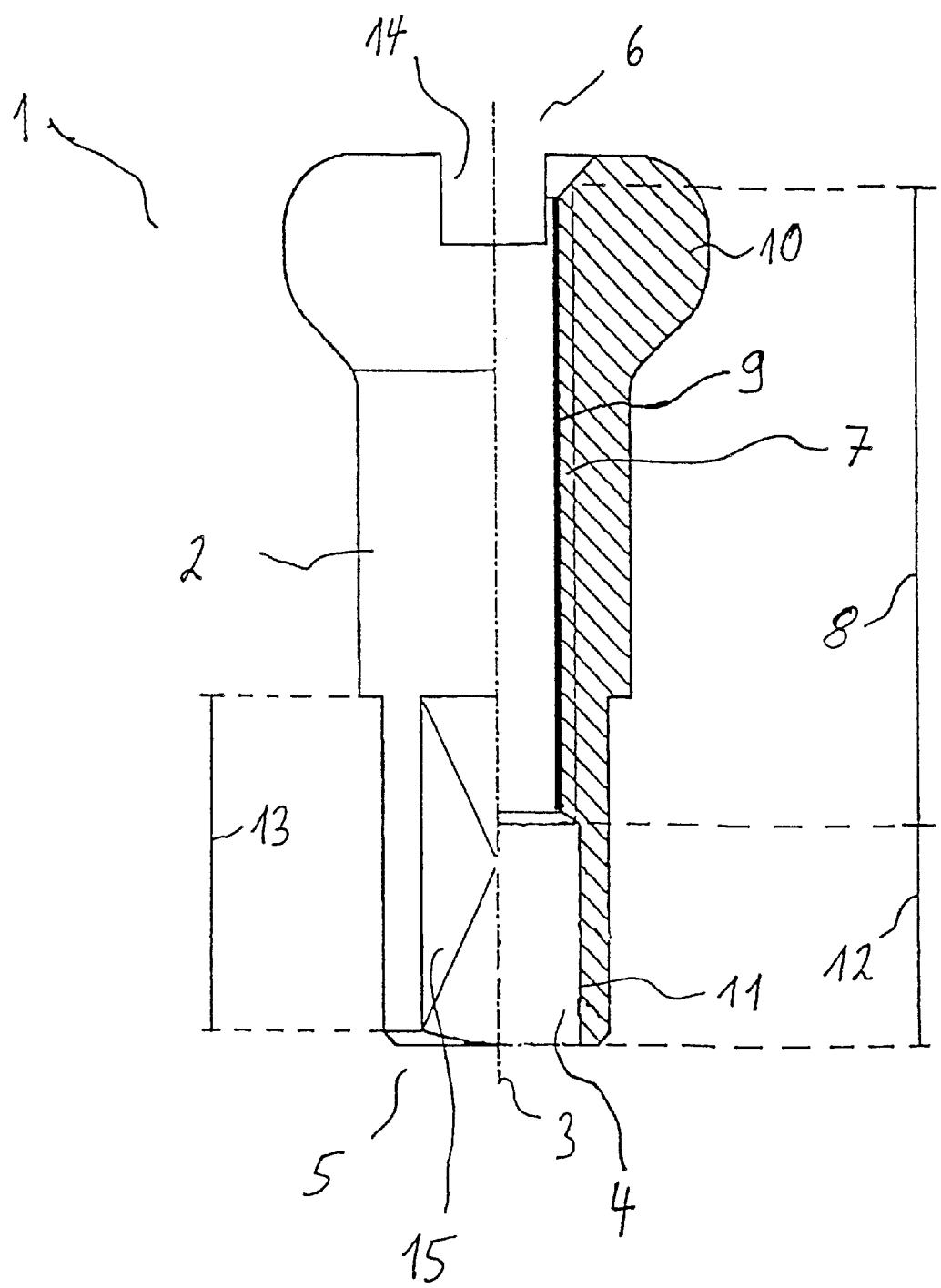

A third embodiment of the spoke nipple 1 according to the present invention is represented in FIG. 3. The dimensions and designations of this embodiment also correspond to those of the first embodiment.

Spoke nipple 1 according to the present invention comprises a nipple head 10 at a first end and a multi-edge element 15 at a second end. An inner thread 7 is disposed in a through bore hole 4 having a longitudinal axis 3 within section 8, a spoke (not shown) to be screwed into said end.

The spoke nipple according to the present invention furthermore comprises a quantity of glue 9 which is arranged in the inner thread 7 of said spoke nipple. After manufacture of the actual nipple 1 according to the present invention, same is submerged into a glue emulsion so that essentially the entire nipple is coated with a fine glue coating. After removing the nipple from the glue emulsion, the glue, which in the embodiment contains latex, is blown off the surface of the spoke nipple. Due to capillary effect, the glue thereby essentially remains over the entire section 8 of inner thread 7. Subsequent to the drying of the surplus solvent, the glue then remains in section 8 of inner thread 7, there forming quantity of glue 9.

When spoke nipple 1 according to the present third embodiment is screwed onto the outer thread of a spoke, the outer thread with the spoke comes into contact with the inner thread 7 and thereby with the quantity of glue 9 of spoke nipples 1 whereby, for example, the micro-particles open and a reliable bonding effect forms between the thread of the spoke and the thread of the spoke nipple.

The spoke nipple represented in FIGS. 1 and 2 is preferably manufactured according to a method in which each spoke nipple is fed a defined quantity of glue from one end, whereby this process may also transpire in such a way that initially a first glue component is supplied and thereafter a second glue component, thus resulting in a quantity of glue in spoke nipple 1 having a spatial separation of two glue components as shown in FIG. 2.

Spoke nipple 1 shown in FIG. 3 may likewise be manufactured according to a method in which the spoke nipple is fed a specific quantity of glue. The feeding may, for example, transpire with a thin hose or a thin small tube and subsequent to the feed, the spoke nipple is then rotated about its longitudinal axis at a relatively high rotational speed such that the effect of centrifugal force produces an essentially uniform distribution over the thread section of spoke nipple 1.

It is likewise possible in another embodiment that, for example, a thin hose is introduced into second end 6 of the spoke nipple and essentially inserted through the entire section 8 of inner thread 7. Afterwards, the glue is fed into the thin hose and exits through the opening at the end. Simultaneous to conveying the glue, the tube is again moved toward the second end 6 of the spoke nipple so that during the discharging of the glue, the tube is again extracted from the nipple. Such a procedure enables the glue to be distributed essentially homogeneously over the entire section 8 whereby, for example, an additional rotation of spoke nipple 1 induces a homogenization over its longitudinal axis.

What is claimed is:

1. Spoke nipple, particularly for bicycles and similar contrivances, comprising:
    a body, configured substantially rotation symmetrical to a longitudinal axis of said body,
    a bore hole accessible from a first end of said body which is arranged concentrically to said longitudinal axis,
    a screw thread disposed in said bore hole, its axis coinciding with said longitudinal axis, which extends in a longitudinal section and which is provided for receiving a spoke having a corresponding thread, and
    a quantity of glue provided in said spoke nipple, whereby said quantity of glue is furthermore so structured and arranged so as to become activated to function as an agent to secure the screw thread upon a spoke being screwed into said spoke nipple.

2. Spoke nipple according to claim 1, wherein a substantially annular protuberance, arranged on a second end of said body, is provided as a nipple head.

3. Spoke nipple according to claim 1, wherein said glue comes from a group of glues which comprises single, double or multi-component glues, acrylic glues or acylate, synthetic or epoxy resins with the corresponding hardeners, or other standard or similar glues.

4. Spoke nipple according to claim 1, wherein said quantity of glue is divided into at least two partial quantities, whereby at least one of said at least two partial quantities is arranged in an interconnected manner.

5. Spoke nipple according to claim 1, wherein said quantity of glue is divided into at least two partial quantities which are substantially separated spatially from one another.

6. Spoke nipple according to claim 4, wherein at least one of said at least two partial quantities is provided fundamentally in a form taken from a group of forms which comprises beads, cylinders, rods, ellipsoids, cubes, and other such similar shapes.

7. Spoke nipple according to claim 4, wherein at least one of said at least two partial quantities is applied substantially evenly.

8. Spoke nipple according to claim 4, wherein at least one of said at least two partial quantities is enveloped by an substantially intact sealed protective layer, for example a casing, which has a protective layer of a group of protective layers comprising air-tight protective layers, protective layers with a thickness which is substantially thinner than 1 mm, protective layers with a thickness thinner than 0.5 mm, protective layers with a thickness thinner than 0.1 mm, and a combination thereof.

9. Spoke nipple according to claim 8, wherein said protective layer is made from a substance taken from a group of substances which comprises finishes, gelatins, polyvinyl alcohols, synthetic and natural materials, glues or other such similar substances, whereby one protective layer may comprise one, two or more protective layer strata made of different substances and different partial quantities may have different protective layers.

10. Spoke nipple according to claim 4, wherein at least two partial quantities of said glue are arranged substantially adjoining.

11. Spoke nipple according to claim 10, wherein a first partial quantity having a first glue component is arranged substantially adjacent to a second partial quantity having a second glue component.

12. Spoke nipple according to claim 8, wherein the screwing in of a spoke destroys at least the protective layer of at least one of said at least two partial quantities and activates said glue.

13. Spoke nipple according to claim 4, wherein at least one of said at least two partial quantities is arranged in a section of said bore hole having no screw thread.

14. Spoke nipple according to claim 4, wherein at least one of said at least two partial quantities is disposed at least partially in said bore hole and in said longitudinal section of said screw thread.

15. Spoke nipple according to claim 4, wherein at least one of said at least two partial quantities is disposed evenly over a section arranged to comprise more than 50% of the length of said screw thread.

16. Spoke nipple according to claim 1, wherein said body is made substantially from a group of materials comprising metal, steel, a light metal, brass, aluminum, titanium and from an aluminum or titanium alloy with a surface that is coated and/or nickel-plated.

17. Spoke nipple according to claim 1, wherein a longitudinal segment of a section near the first end has substantially a form that is taken from a group of forms comprising a polygonal outer profile and a rectangle.

18. Spoke nipple according to claim 1, wherein said quantity of glue comprises at least two components, whereby said second component is provided in the form of small particles disposed randomly static within said first component.

19. Method for manufacturing a spoke nipple having a quantity of glue as in any one of the preceding claims, especially for bicycle wheels and similar contrivances, which comprises the steps:
 a) saturating of at least a portion of a spoke nipple with a glue solution; and
 b) drying of the spoke nipple.

20. Method according to claim 19, wherein the saturation transpires within a glue solution with a subsequent removal of the glue solution from the outer surface of the spoke nipple ensuing, by means of being blown off.

21. Method according to claim 19, wherein said quantity of glue is supplied to said spoke nipple by means of a feeding device.

22. Spoke nipple according to claim 5, wherein at least one of said at least two partial quantities is provided fundamentally in a form taken from a group of forms which comprises beads, cylinders, rods, ellipsoids, cubes, and other such similar shapes.

23. Spoke nipple according to claim 5, wherein at least one of said at least two partial quantities is applied substantially evenly.

24. Spoke nipple according to claim 5, wherein at least one of said at least two partial quantities is enveloped by a substantially intact sealed protective layer, for example a casing, which has a protective layer of a group of protective layers comprising air-tight protective layers, protective layers with a thickness which is substantially thinner than 1 mm, protective layers with a thickness thinner than 0.5 mm, protective layers with a thickness thinner than 0.1 mm, and a combination thereof.

25. Spoke nipple according to claim 24, wherein said protective layer is made from a substance taken from a group of substances which comprises finishes, gelatins, polyvinyl alcohols, synthetic and natural materials, glues or other such similar substances, whereby one protective layer may comprise one, two or more protective layer strata made of different substances and different partial quantities may have different protective layers.

26. Spoke nipple according to claim 15, wherein at least two partial quantities of said glue are arranged substantially adjoining.

27. Spoke nipple according to claim 26, wherein a first partial quantity having a first glue component is arranged substantially adjacent to a second partial quantity having a second glue component.

28. Spoke nipple according to claim 24, wherein the screwing in of a spoke destroys at least the protective layer of at least one of said at least two partial quantities and activates said glue.

29. Spoke nipple according to claim 5, wherein at least one of said at least two partial quantities is arranged in a section of said bore hole having no screw thread.

30. Spoke nipple according to claim 5, wherein at least one of said at least two partial quantities is disposed at least partially in said bore hole and in said longitudinal section of said screw thread.

31. Spoke nipple according to claim 5, wherein at least one of said at least two partial quantities is disposed evenly over a section arranged to comprise more than 50% of the length of said screw thread.

* * * * *

UNITED STATES PATENT AND TRADEMARK OFFICE
CERTIFICATE OF CORRECTION

PATENT NO. : 6,557,946 B1
DATED : May 6, 2003
INVENTOR(S) : Gerritt Jager and Maurizio d'Alberto It is certified that error appears in the above-identified patent and that said Letters Patent is hereby corrected as shown below:

<u>Title page,</u>
Item [76], Inventors, the first named inventor's name is transposed "Jager Gerritt" and should read -- Gerrit Jager --.

Signed and Sealed this

Ninth Day of September, 2003

JAMES E. ROGAN
*Director of the United States Patent and Trademark Office*